United States Patent [19]

Wohrl

[11] Patent Number: 4,750,327
[45] Date of Patent: Jun. 14, 1988

[54] CONNECTION APPARATUS BETWEEN THE OUTLET OF A HEAT EXCHANGER AND THE INLET OF A COMBUSTION CHAMBER OF A GAS TURBINE ENGINE

[75] Inventor: Bernhard Wohrl, Gauting, Fed. Rep. of Germany

[73] Assignee: MTU, Munich, Fed. Rep. of Germany

[21] Appl. No.: 897,412

[22] Filed: Aug. 18, 1986

[30] Foreign Application Priority Data

Aug. 16, 1985 [DE] Fed. Rep. of Germany ....... 3529457

[51] Int. Cl.$^4$ .............................................. F02C 7/10
[52] U.S. Cl. ................................................ 60/39.511
[58] Field of Search ........................ 60/39.511, 39.32; 165/52

[56] References Cited

U.S. PATENT DOCUMENTS

| | | | |
|---|---|---|---|
| 3,201,938 | 8/1965 | Zirin | 60/39.511 |
| 3,204,406 | 9/1965 | Howes et al. | 60/39.511 |
| 3,759,323 | 9/1973 | Dawson et al. | 60/39.511 |
| 3,968,834 | 7/1976 | Mangus et al. | 60/39.511 |
| 4,030,288 | 6/1977 | Davis et al. | 60/39.511 |
| 4,031,953 | 6/1977 | Kline | 60/39.511 |

Primary Examiner—Louis J. Casaregola
Assistant Examiner—Donald E. Stout
Attorney, Agent, or Firm—Roberts Spiecens & Cohen

[57] ABSTRACT

A gas turbine engine with an exhaust gas heat exchanger comprising a connection between the heat-exchanger outlet and an inlet of a combustion chamber for supplying heated compressed air to the combustion chamber, the connection including two pipes with a flexible element in the form of a metal bellows to compensate for thermal expansion. The pipes are symmetrically disposed and laterally spaced with respect to a line connecting the axis of the gas turbine to the axis of the heat exchanger outlet such that the metal bellows converge at an acute angle in the direction towards the heat exchanger. At one end the pipes are connected to the outlet of the heat exchanger by a pipe elbow and at their other ends to an inlet casing of the combustion chamber. In this way, differential temperature displacements are minimized.

11 Claims, 2 Drawing Sheets

FIG. 2
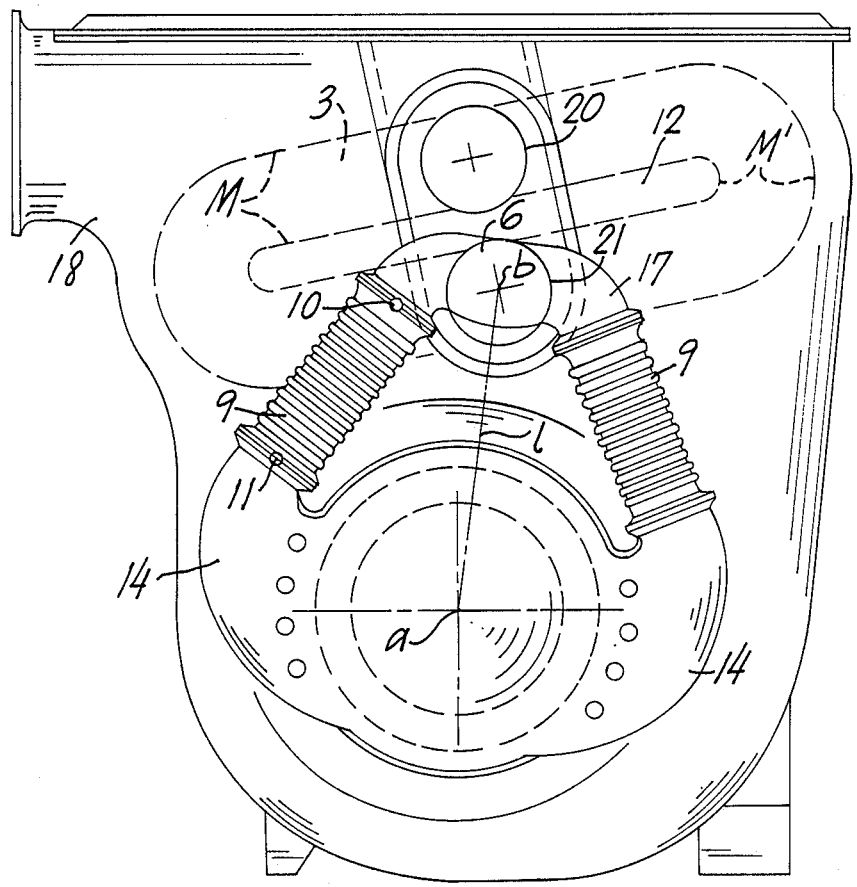
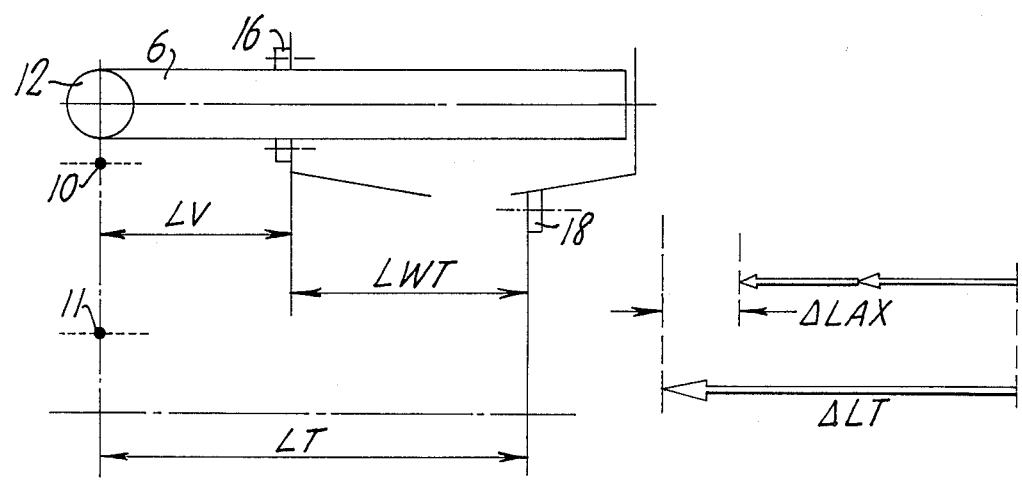
FIG. 3

CONNECTION APPARATUS BETWEEN THE OUTLET OF A HEAT EXCHANGER AND THE INLET OF A COMBUSTION CHAMBER OF A GAS TURBINE ENGINE

FIELD OF THE INVENTION

The present invention relates to a gas turbine engine having a heat exchanger secured to the casing of a gas turbine for heating compressed air from a compressor before it is supplied to the combustion chamber of the engine. A flexible metallic pipe connection such as a metal bellows connects the outlet of the heat exchanger and the of the combustion chamber inlet to compensate for differential thermal effects.

The invention particularly relates to the construction of the connection between the outlet of the heat exchanger and the inlet of the combustion chamber.

PRIOR ART

In a known gas turbine engine of this type, a flexible metallic pipe element in the form of a metal bellows is arranged substantially in direct connection between the outlet of a gas heat exchanger and the inlet of the combustion chamber. The bellows is exposed, in operation, to comparatively high temperatures and thus undergoes displacements due to thermal changes which can produce stresses exceeding the allowable causing rupture of the bellows.

SUMMARY OF THE INVENTION

An object of the present invention is to provide a connection between the heat exchanger and the combustion chamber of a gas turbine engine which substantially eliminates the problems associated with thermal expansion.

In particular, the invention seeks a construction of the aforesaid connection in the form of a metal bellows whose displacement due to thermal effects is kept to a minimum hereby avoiding development of stress which could cause rupture.

In order to satisfy the above objects, the invention provides that said connection comprises two pipes constituted as metal bellows having central axes disposed in a radial plane and wherein said axes are inclined to form an acute angle therebetween and are symmetrically disposed relative to a line joining the outlet of the heat exchanger and the inlet of the combustion chamber, means including a manifold connected to the pipes at a first of the ends thereof, an elbow connecting the manifold to the outlet of the heat exchanger, and means connecting the second of the ends of the pipes to the inlet of the combustion chamber.

The two metal bellows are preferably of rectilinear configuration and, in particular, converge towards the heat exchanger and form an acute angle of about 60° therebetween.

In a particularly simple construction, sockets connect the bellows to the casing of the combustion chamber and are integral therewith.

According to a feature of the invention, the connection between the outlet of the compressor and the inlet of the heat exchanger is preferably constructed and arranged in the same manner as the connection between the outlet of the heat exchanger and the inlet of the combustion chamber.

The invention is based on the concept of so minimizing the relative displacements of the ends of the metal bellows at their connection points to an elbow at the outlet of the heat exchanger and to the casing at the inlet of the combustion chamber by a particular construction so that the metal bellows or equivalent elastic connecting elements are deformed to produce acceptable stresses. This is achieved by the symmetrical arrangement of the two bellows which produces displacements of the ends of the bellows which are at least partially equilibrated due to subtraction of the displacement vectors at said ends.

BRIEF DESCRIPTION OF THE FIGURES OF THE DRAWING

The invention will be described in detail hereafter with reference to a preferred embodiment shown in the accompanying drawing, in which:

FIG. 2 is an elevational view from the left end in FIG. 1 of the gas turbine engine;

FIG. 3 diagrammatically shows the axial displacement vectors of the turbine casing, the heat exchanger casing and the pipe elbow.

DETAILED DESCRIPTION OF A PREFERRED EMBODIMENT

Figure 1:
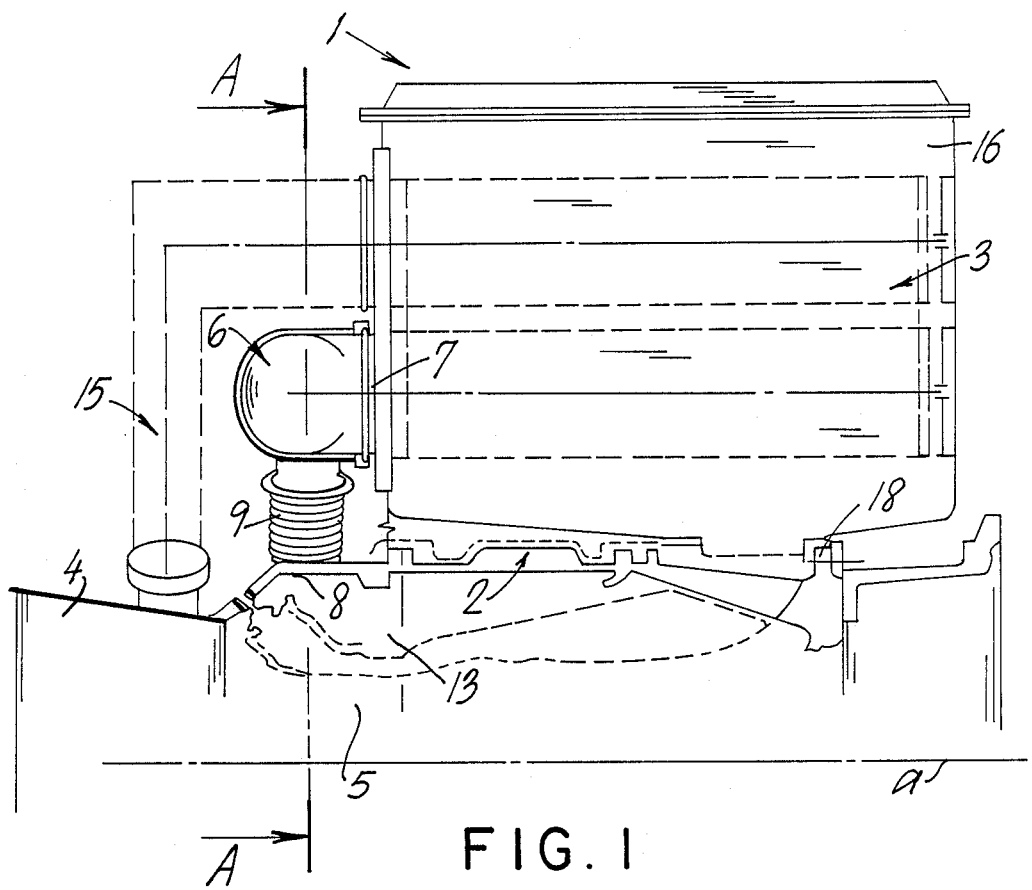
FIG. 1 is a diagrammatic axial section through a part of a gas turbine engine with heat exchanger, according to the invention.

FIG. 1 shows a gas turbine engine 1 having an engine casing 2 with an exhaust gas heat exchanger 3 secured to the casing 2 for heating compressed air from a compressor 4 before the air is introduced into a combustion chamber 5 of the turbine. As seen in FIGS. 1 and 2, in order to convey the heated compressed air from the heat exchanger 3 to the combustion chamber, a connection 6 connects the outlet 7 of the heat exchanger and the inlet 8 of the combustion chamber. The connection 6 is subjected to differential thermal effects which causes development of stresses in the connection and, in accordance with the invention, the connection 6 comprises a pair of metal bellows 9 in a particular arrangement to minimize such stresses as will be explained in greater detail later.

Figure 4:
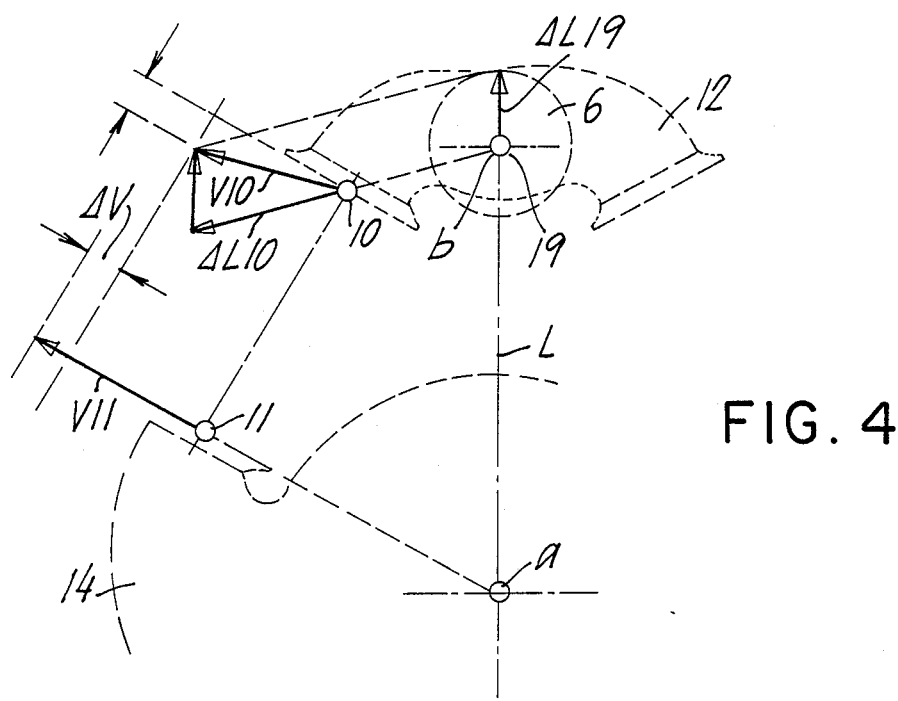
FIG. 4 is a vector diagram of the movements of the connection points of two metal bellows due to thermal expansion in the radial plane of section A—A.

In the gas turbine engine 1 of FIG. 1, the heat exchanger includes a casing 16 which surrounds a tube matrix M,M' of the heat exchanger 3 and resists the support and reaction forces thereof. The casing 16 is securely connected at attachment 18 to the turbine engine casing 2. In operation, the compressed air from the compressor 4 flows through a pipe 15 to the tube matrix of the heat exchanger 3. After transfer to the compressed air of residual heat from exhaust gas from the turbine which flows through heat exchanger 3, the heated compressed air is discharged into connection 6 and then to the casing 14 of the combustion chamber. All of the structural parts of the gas turbine engine 1 are subject to different thermal expansions which may lead to the development of impermissible stresses and strains in individual structural parts. In particular, the connection 6 which conveys the hot air must resist the differential expansions, in the radial direction, as shown in FIG. 3, and in the axial direction, as shown in FIG. 4, between the hot casing 14 of the combustion chamber and the casing 16 of the heat exchanger which is insulated on the inside and is therefore cooler.

In the embodiment shown, the heat exchanger 3 is a known profiled-tube heat exchanger of cross flow, countercurrent construction such as disclosed in FRG patent DE-3146089 and U.S. application Ser. No. 812,278 now allowed. In heat exchanger 3 the tube matrix M,M' (FIG. 2) consists of profiled tubes which project laterally in U shape from the pipes 20, 21 which respectively receive and discharge the compressed air, the profiled tubes being completely surrounded by the stream of turbine exhaust gas flowing through the heat exchanger 3 whereby the compressed air is heated by the turbine exhaust gas.

The high temperatures and pressures which occur are resisted, in accordance with the invention, by the elastic metallic connecting elements, such as metal bellows 9. The bellows 9 are two in number and are arranged in radial plane A—A in FIG. 1 laterally and symmetrically with reference to a line 1 joining the axis a of the inlet of the gas turbine and the axis b of the outlet 7 of the heat exchanger 3. The two bellows 9 form an acute angle $\alpha$ therebetween and converge in the direction towards the heat exchanger 3. The two bellows 9 are connected at their upper ends to a manifold 17 of an elbow 12 connected to the outlet 7 of the heat exchanger. The connection of the upper ends of the bellows 9 to the manifold 17 can be considered to be effected at a theoretical pivot point 10 disposed on the axis of the bellows in the plane of its connection to the manifold. At their lower ends, the bellows 9 are connected to inlet sockets 13 which are integral with the casing 14 of the combustion chamber, as shown in FIG. 2, at theoretical pivot points 11.

The metal bellows 9 are straight and have rectilinear axes which form an acute angle $\alpha$ of about 60° therebetween as shown in FIG. 1.

As can also be seen in detail in FIG. 2, the manifold 17 of the pipe elbow 12 is a bifurcated member with two branches respectively connected to the bellows 9 to produce two flow paths for the heated compressed air to the casing 14 of the combustion chamber. Between the manifold 17 and the two sockets 13 of the casing 14 of the combustion chamber the two metal bellows 9 proper are installed. The points of intersection of the center axes of the metal bellows 9 with the flange surfaces of the manifold 17 and the sockets 13 integral with combustion chamber casing 14 are the theoretical pivot points 10 and 11 of the two metal bellows.

FIG. 3 shows axial displacement vectors $\Delta LT$, $\Delta LWT$, $\Delta LV$. Displacement vector $\Delta LT$ represents the axial displacement of the casing 14 of the combustion chamber in plane A—A due to heating of the casing in operation. Displacement vector $\Delta LWT$ represents axial displacement of the casing 16 of the heat exchanger 3 at its outlet 7 due to heating during operation. Displacement vector $\Delta LV$ represents axial displacement of the center of pipe elbow 12 in radial plane A—A. The difference in axial displacement from plane A—A of the casing 14 and the pipe elbow 12 is represented by axial displacement vector $\Delta LAX$. The axial displacement vector $\Delta LAX$ must be accommodated and resisted by the flexible connecting elements of connection 6, i.e. metal bellows 9.

The movements of the ends of the metal bellows, i.e. points 10 and 11 in radial plane A—A due to thermal expansion are shown in the vector diagram in FIG. 4. The theoretical point of connection 19 of the pipe elbow 12 at the casing 16 of the heat-exchanger undergoes a radial movement of $\Delta L19$ upwardly, while the connection point 10 of the flexible connecting element 9 moves through a distance $\Delta L10$ along a line connecting points 10 and 19 in a longitudinal plane containing these points. The vectorial sum of the displacements $\Delta L19$ and $\Delta L10$ produces a resultant displacement vector V10 representing the net displacement of point 10. It is to be noted that the y components of $\Delta L19$ and $\Delta L10$ act in opposite directions and subtract from one another so that there is little or no radial displacement at point 10 in the y direction.

The connection point 11 of bellows 9 at the casing 14 of the combustion chamber undergoes a radial displacement relative to the axis a represented by the displacement vector V11. The difference $\Delta V$ between the displacement vectors V10 and V11 represents the difference in displacement between connection points 10 and 11 in radial plane A—A which must be taken up by bellows 9. Since $\Delta V$ is the difference between V10 and V11 which act generally in the same direction there is a substantially minimal net displacement of the connection points 10 and 11 in the radial plane and consequent minimal deflection and stressing of the flexible connecting elements or metal bellows.

Thereby the temperature-induced net displacements of the individual structural parts during operation of the gas turbine engine 1 are kept so slight that the resultant stresses of the material of the flexible connecting elements do not exceed the allowable stresses of the material even though these allowable stresses are substantially reduced at high temperature. In this way, the metal bellows need not be made of sophisticated, expensive material having high strength at high temperature, but rather can be made of conventional material and there will be substantially no risk of rupture.

From the above, it is seen that the particular embodiment of the connection 6 between the outlet of the heat exchanger and the inlet of the combustion chamber in the form of the two bellows 9 provides minimal net displacement of the connection ends of the respective bellows with consequent minimal stressing of the bellows.

The pipe 15 which connects the outlet of the compressor 4 to the inlet of the heat exchanger 3 has a right angle bend therein as shown in FIG. 1. The pipe 15 may be of the same construction as the connection 6 described hereinabove between the outlet of the heat exchanger and the inlet of the combustion chamber.

Although the invention has been described above in relation to a specific embodiment thereof, it will become apparent to those skilled in the art that numerous modifications and variations can be made within the scope and spirit of the invention as defined in the attached claims.

What is claimed is:

1. In a gas turbine engine construction including compressor means, combustion chamber means, turbine means and an engine casing, the combustion chamber means having an inlet casing for compressor air, a heat exchanger secured to said engine casing externally thereof, said heat exchanger having a tubular inlet and a tubular outlet, means for supplying compressed air from the compressor means to the tubular inlet of the heat exchanger for heating the compressed air by hot exhaust gases flowing from the turbine means through the heat exchanger and means for receiving the heated compressed air at the tubular outlet of the heat exchanger and supplying the heated compressed air to the inlet casing of the combustion chamber means, the improvement wherein said means which receives the heated compressed air from the tubular outlet of the heat exchanger and supplies the heated compressed air to the inlet casing of the combustion chamber means comprises two pipes each constituted as an elastic bellows, said pipes having central axes disposed in a radial plane, said axes being inclined in said radial plane to form an acute angle therebetween and converging towards the tubular outlet of the heat exchanger and further being symmetrically disposed relative to a line joining the tubular outlet of the heat exchanger and the combustion chamber means, means including a manifold having respective branches connected to the pipes at a first of the ends of said pipes, an elbow connecting the branches of the manifold to the tubular outlet of the heat exchanger, and means connecting the second of the ends of the pipes directly to the inlet casing of the combustion chamber means.

2. The improvement as claimed in claim 1 wherein each bellows is rectilinear.

3. The improvement as claimed in claim 1 wherein said acute angle is 60°.

4. The improvement as claimed in claim 1 wherein said means connecting the second of the ends of the pipes to the inlet of the combustion chamber comprises sockets at said second ends casing of the pipes integral with said inlet casing of the combustion chamber.

5. The improvement as claimed in claim 1 wherein said elbow includes a right-angle bend.

6. The improvement as claimed in claim 1 wherein said manifold includes a bifurcated member forming said branches with respective connections to said pipes, said elbow being connected to said bifurcated member.

7. The improvement as claimed in claim 6 wherein said elbow is integral with said bifurcated member.

8. The improvement as claimed in claim 7 wherein said means connecting the second of the ends casing of the pipes to the inlet of the combustion chamber comprises sockets at said second ends of the pipes integral with said inlet casing of the combustion chamber.

9. The improvement as claimed in claim 1 wherein said heat exchanger is secured to said engine casing at a fixed connection longitudinally spaced from the radial plane containing the axes of the pipes.

10. The improvement as claimed in claim 1 wherein the heat exchanger is disposed above the turbine means.

11. The improvement as claimed in claim 1 wherein said line joining the outlet of the heat exchanger and the combustion chamber means passes through a longitudinal axis at said outlet, on the one hand, and through a longitudinal axis of said gas turbine engine on the other hand.

* * * * *